(12) United States Patent
Sircar et al.

(10) Patent No.: US 11,210,462 B1
(45) Date of Patent: Dec. 28, 2021

(54) VOICE INPUT PROCESSING

(71) Applicant: Amazon Technologies, Inc., Seattle, WA (US)

(72) Inventors: Ayan Sircar, Sunnyvale, CA (US); Abhishek Mehrotra, San Jose, CA (US); Aniruddha Deshpande, San Ramon, CA (US); Padmini Rajanna, Fremont, CA (US); Pawan Kaunth, South San Francisco, CA (US); Vaibhav Jain, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 16/439,572

(22) Filed: Jun. 12, 2019

(51) Int. Cl.
| | |
|---|---|
| *G10L 15/00* | (2013.01) |
| *G06F 40/205* | (2020.01) |
| *G06F 16/9032* | (2019.01) |
| *G06F 16/903* | (2019.01) |
| *G10L 15/08* | (2006.01) |
| *G06F 3/16* | (2006.01) |
| *G06Q 30/06* | (2012.01) |
| *G06F 16/9035* | (2019.01) |
| *G06F 40/284* | (2020.01) |

(52) U.S. Cl.
CPC ............ *G06F 40/205* (2020.01); *G06F 3/167* (2013.01); *G06F 16/9035* (2019.01); *G06F 16/90332* (2019.01); *G06F 16/90335* (2019.01); *G06F 40/284* (2020.01); *G06Q 30/0627* (2013.01); *G06Q 30/0643* (2013.01); *G10L 15/08* (2013.01); *G10L 2015/088* (2013.01)

(58) Field of Classification Search
CPC ................. G06F 40/205; G06F 40/284; G06F 16/90332; G06F 16/9035; G06F 16/90335; G06F 3/167; G06Q 30/0627; G06Q 30/0643; G10L 15/08; G10L 2015/088
USPC ................. 704/231, 270.1, 235; 706/11, 46; 707/726, E17.064
See application file for complete search history.

(56) References Cited

U.S. PATENT DOCUMENTS 8,566,102 B1 * 10/2013 Bangalore ............... G10L 15/22
704/270.1

* cited by examiner

*Primary Examiner* — Charlotte M Baker
(74) *Attorney, Agent, or Firm* — Knobbe Martens Olson & Bear LLP

(57) ABSTRACT

Systems and methods are described for processing voice input to detect and remove voice recognition errors in the context of a product attribute query. Spoken-word input may be processed to tentatively identify a query regarding a product and an attribute. A hierarchical product catalog is then used to identify categories that include the identified product, and an affinity score is determined for each category to indicate the relative strength of the relationship between the category and the attribute. The affinity score for each category is determined based on historical questions submitted to a question and answer service with regard to other products in the category. An affinity score for the product-attribute pairing is then determined based on a weighted average of the affinity scores for the product categories, and the affinity score is used to determine whether the question is valid and the voice input has been correctly processed.

21 Claims, 9 Drawing Sheets

Fig. 2

| PRODUCT INFORMATION DATA STORE 160 | AFFINITY WITH ATTRIBUTE "WATERPROOF" |
|---|---|
| CLOTHING | |
|   MEN'S CLOTHING | |
|     ACCESSORIES | |
|       BELTS | |
|         BRAND X CASUAL LEATHER BELT | 0.1 |
|         BRAND Y WOVEN STRETCH GOLF BELT | 0.1 |
|         BRAND Z MEN'S DRESS BELT | 0.3 |
|       WATCHES | 0.1 |
|         BRAND A STAINLESS STEEL DIVER'S WATCH | 0.9 |
|         BRAND Z DRESS WATCH | 1.0 |
|         BRAND C SPORTS WATCH | 1.0 |
|     CLOTHING | 0.1 |
|       SHIRTS | 0.1 |
|         DRESS SHIRTS | 0.1 |
|         T-SHIRTS | 0.1 |
|           BRAND X CASUAL T-SHIRT | |
|           BRAND C CASUAL T-SHIRT | |
|         POLOS | |
|   WOMEN'S CLOTHING | 0.1 |
|   CHILDREN'S CLOTHING | 0.1 |
| BOOKS | 0.1 |
|   NON-FICTION | 0.1 |
|     BUSINESS | 0.1 |
|       WATCH AND LEARN: THE BRAND C STORY | 0.0 |
|         HARDCOVER | |
|         PAPERBACK | |
|         E-BOOK | |
| ELECTRONICS | 0.1 |
|   TELEVISIONS | 0.1 |
|   ... | |

*Fig. 4B*

VOICE INPUT PROCESSING

BACKGROUND

Generally described, computing devices can utilize a communication network, or a series of communication networks, to exchange information. In a common application, a computing device can request information from another computing device or devices via a communication network. For example, a personal computing device that accepts audio input can send unprocessed or pre-processed speech via a communication network to a server computing device or devices, which may process (or further process) the input to recognize words and commands. The processing of the words or commands can generate a result that can be communicated via the communication network to the same personal computing device or a different device.

In some environments, the processing of input to recognize words and commands may be inaccurate, ambiguous, or incomplete. For example, audio input may be accompanied by background noise that interferes with speech recognition, or words may be recognizable but could map to a number of different possible objects.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 2 is a pictorial diagram depicting a user interface presented by a community question and answer service in accordance with aspects of the present disclosure.

FIGS. 4A and 4B are pictorial diagrams depicting a hierarchical product catalog and the determination of affinity scores for various product categories in accordance with aspects of the present disclosure.

DETAILED DESCRIPTION

Figure 1:
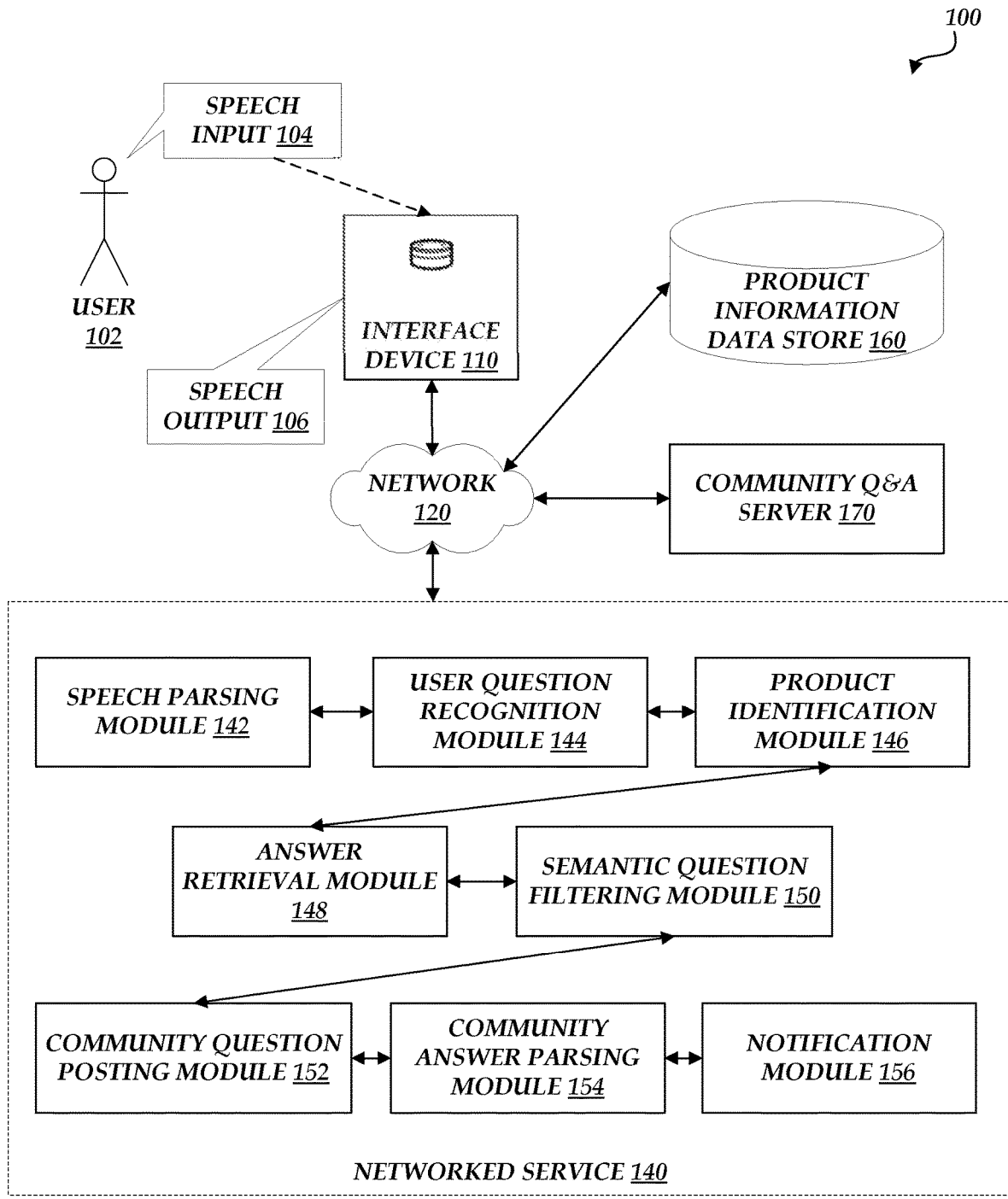
FIG. 1 is a block diagram depicting an illustrative environment in which a semantic question filtering module validates voice input in accordance with aspects of the present disclosure.

Generally described, aspects of the present disclosure relate to processing voice inputs provided to a network service. More specifically, aspects of the present disclosure are directed to systems, methods, and computer-readable media related to determining whether processed, spoken-word input has been correctly parsed into logically and semantically valid queries. Illustratively, a user may interact with a networked service via an interface device configured to capture inputs from the user, including audible inputs. Such interface devices can include specifically configured devices, often referred to as a "smart speaker," mobile computing devices, embedded devices, or other types of computing devices. Illustratively, the interface device may be configured to receive speech-based input from users and process the speech input locally to recognize words. In another example, the interface device may pass speech input to the networked service for processing, or may partially process the speech input before sending partially processed speech input to the networked service.

With reference now to an illustrative example, the speech input may correspond to a question about an attribute of an item, such as a product or service. For example, the speech input may be a question such as "how many calories are in the Brand X sports drink?" or "what is the battery life of a Brand Y laptop computer?" The question may be intended to elicit a response from the networked service, and this response may be provided to the requesting user via the interface device. The networked service may thus process the speech input to identify the specific product and attribute.

In some aspects, the networked service may maintain information that allows it to provide an answer to a question posed by the user. For example, the networked service may maintain or have access to product information regarding the Brand X sports drink. The networked service may thus be able to obtain the product information, find the calorie content of the Brand X sports drink, and make this information available to the user (e.g., as speech output by the interface device). In other aspects, however, the answer to a user question may not be available from the resources available to the networked service. The networked service may thus seek an answer to the user's question from an external source. For example, the networked service may generate and transmit queries based on the processed speech input, such as by posting a written question to a community forum or by transmitting targeted questions to a set of identified third parties.

However, the processing of free-form audio input into queries may result in questions that, if posted to a community forum, are unlikely to result in meaningful answers and may diminish the value of the forum. Various errors may be introduced when parsing the user's audio input into words, identifying a specific product based on the words, or identifying an attribute based on the words. These errors may result in a question that is nonsensical (e.g., "how many calories are in this Brand Y laptop computer?") or otherwise unlikely to lead to the user obtaining the information sought. This in turn leads to inefficient use of resources as these resources are used to generate, post, and answer erroneous or meaningless questions.

To address these problems, a provider of a networked service may implement a semantic question filtering module in accordance with aspects of the present disclosure. As described in more detail below, a semantic question filtering module may obtain speech input corresponding to a product information query that has been processed to identify a particular product and a particular attribute The semantic question filtering module may then determine an affinity score between the product and the attribute, and thereby filter out questions that are semantically invalid and likely to be the result of parsing errors. The semantic question filtering module may thus improve the quality of questions that are generated and posted by a networked service.

It will thus be understood that the semantic question filtering module described herein addresses a technical problem that specifically arises in the realm of computer networks, and in particular addresses a problem that arises in the realm of processing inputs that may be parsed erroneously, such as speech-based input. It will further be understood that the technical problem described herein is not analogous to any pre-Internet practice, and that the semantic question filtering module improves the performance of a networked service by enabling the service to make use of a community forum without "polluting" the forum with semantically invalid questions. The provider of a networked service may thus make more effective use of resources and provide services more efficiently.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosures herein described.

FIG. 1 is a block diagram of an illustrative operating environment 100 in which an audio interface device 110 captures speech input 104 from a user 102 and communicates with a networked service 140, a product information data store 160, and a community Q&A server 170 via a network 120. It will be understood that the operating environment 100 may include more (or fewer) elements than those shown in FIG. 1. It is not necessary, however, that all of these elements be shown in order to provide an enabling disclosure.

The audio interface device 110 may illustratively be any computing device that captures speech input 104 in accordance with aspects of the present disclosure. Examples of an audio interface device 110 include mobile computing devices, wearable computing devices, desktop computing devices, laptop computing devices, tablets, "smart" speakers, televisions, e-book readers, gaming consoles, or other devices that implement a speech-based user interface. In some embodiments, the audio interface device 110 may be implemented as a component of another device, such as a "smart" home appliance or Internet of Things ("IoT") device. In some embodiments, the audio interface 110 may generate speech output 106, which may in turn be heard by the user 102.

The audio interface device 110 may communicate with other devices via a network 120. The network 120 may illustratively be any wired or wireless network, or combination thereof. In addition, the network 120 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network 120 may be a private or semi-private network, such as a corporate or university intranet. The network 120 may include one or more wireless networks, such as a Global System for Mobile Communications (GSM) network, a Code Division Multiple Access (CDMA) network, a Long Term Evolution (LTE) network, or some other type of wireless network. The network 120 may use protocols and components for communicating via the Internet or any of the other aforementioned types of networks.

The audio interface device 110 may communicate with a networked service 140, which is described in more detail with reference to FIG. 6 below. In the illustrated embodiment, the networked service 140 includes a speech parsing module 142, a user question recognition module 144, a product identification module 146, an answer retrieval module 148, a semantic question filtering module 150, a community question posting module 152, a community answer parsing module 154, and a notification module 156, which implement aspects of the present disclosure as described in more detail below. In some embodiments, various components of the networked service 140 may communicate with each other via the network 120 or another network. Additionally, in some embodiments, components that are depicted in FIG. 1 as being part of the networked service 140 may be implemented as components of the audio interface device 110 or another computing device. For example, all or part of the speech parsing module 142 or the user question recognition module 144 may be implemented within the audio interface device 110.

The operating environment 100 further includes a product information data store 160. The product information data store 160 may illustratively be any non-transient computer-readable data store including magnetic media, optical media, solid state devices, flash memories, EEPROMs, or other storage media. In various embodiments, the product information data store 160 may be implemented as a database, a database server, a component of another server or service, or may include or be embodied in a data storage web service. In some embodiments, all or part of the product information data store 160 may be implemented by or as a component of the networked service 140.

The operating environment 100 further includes a community Q&A server 170. The community Q&A server 170 may illustratively be any computing device that implements aspects of the present disclosure such as enabling user-to-user communication of product questions and corresponding answers. In some embodiments, the community Q&A server 170 may be implemented as part of another computing device, such as a web server or other platform that services requests for product information (e.g., product detail pages), or may be implemented using multiple computing devices.

Figure 2:
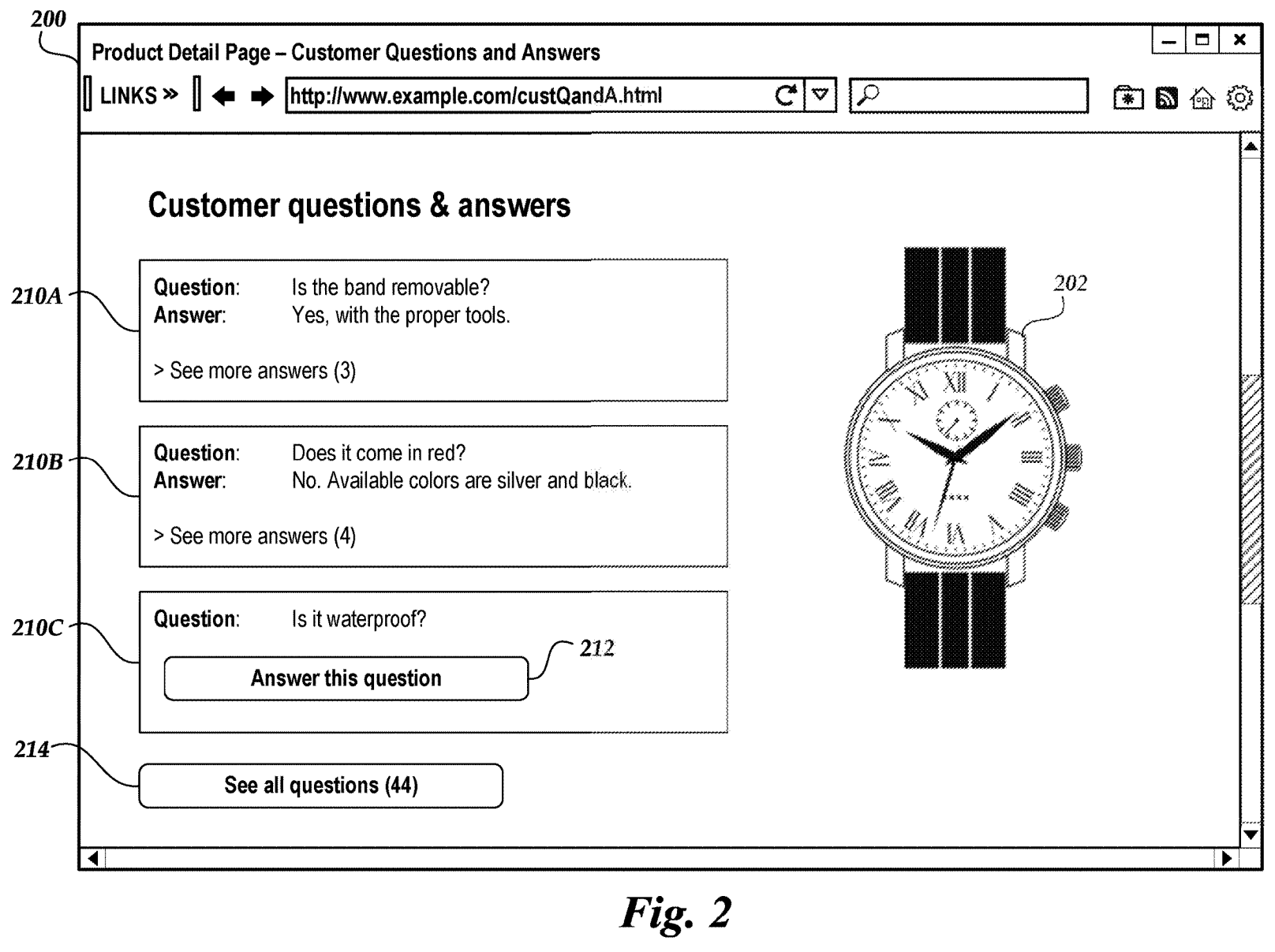

FIG. 2 is a pictorial diagram depicting a user interface 200 presented by a community question and answer service. Illustratively, the user interface 200 may be presented by the community Q&A server depicted in FIG. 1. In the illustrated embodiment, the user interface 200 includes a product image 202 and a selection of product questions 210A-C, which relate to particular attributes of the product. For example, question 210A asks a yes/no question as to whether a part of the product (a watch band) has the "removable" attribute, and question 210B asks whether a "color" attribute can have a particular value ("red"). Questions 210A and 210B are further associated with a number of answers provided by users of the product, one of which is displayed in the user interface 200.

Question 210C is a question regarding the "waterproof" attribute that does not yet have a community answer. The user interface 200 includes an answer button 212, which enables a user of the user interface 200 to provide an answer to question 210C. In some embodiments, user selection of the answer button 212 causes display of a second user interface for capturing the user's answer to the question 210C. In other embodiments, the user interface 200 may be updated after user selection of the answer button 212 to include additional user interface elements, such as a text entry field and a "submit" button. The user interface 200 further includes a "see all questions" button 214, which allows a user of the user interface 200 to view other questions relating to displayed product.

It will be understood that the user who interacts with the user interface 200 to answer a question, such as question 210C, may not be and generally would not be the same user who interacts with an audio interface device to submit the question (e.g., the user 102 depicted in FIG. 1). Rather, the user interface 200 enables communication between users who are seeking information about a particular product and users who are providing (or have provided) the requested information. It will further be understood that FIG. 2 is provided for purposes of example, and that many variations on the user interface 200 are within the scope of the present disclosure.

Figure 3A:
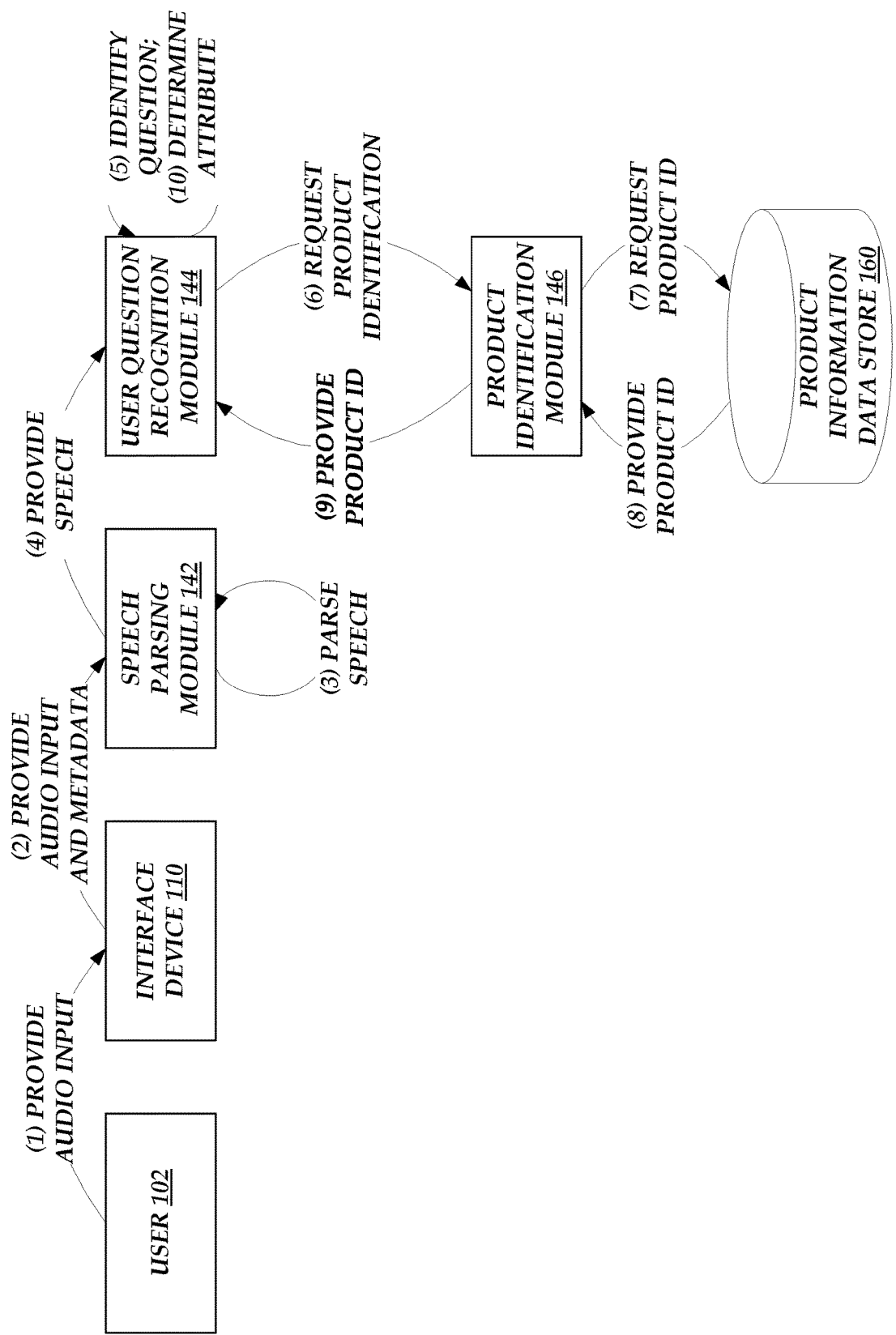
FIGS. 3A, 3B, and 3C are flow diagrams depicting illustrative interactions for using a semantic question filtering module to validate voice input in accordance with aspects of the present disclosure.
Figure 3B:
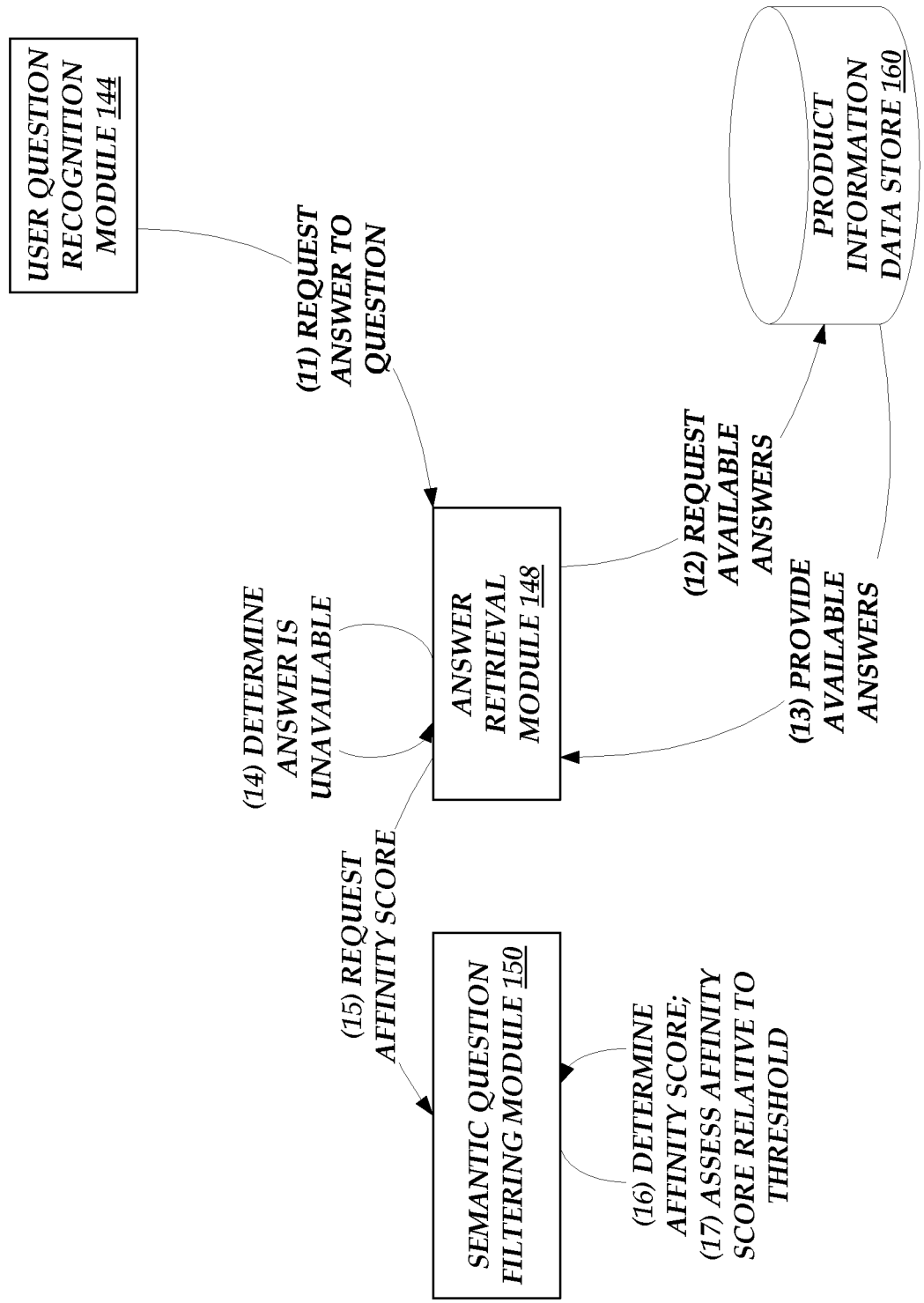
Figure 3C:
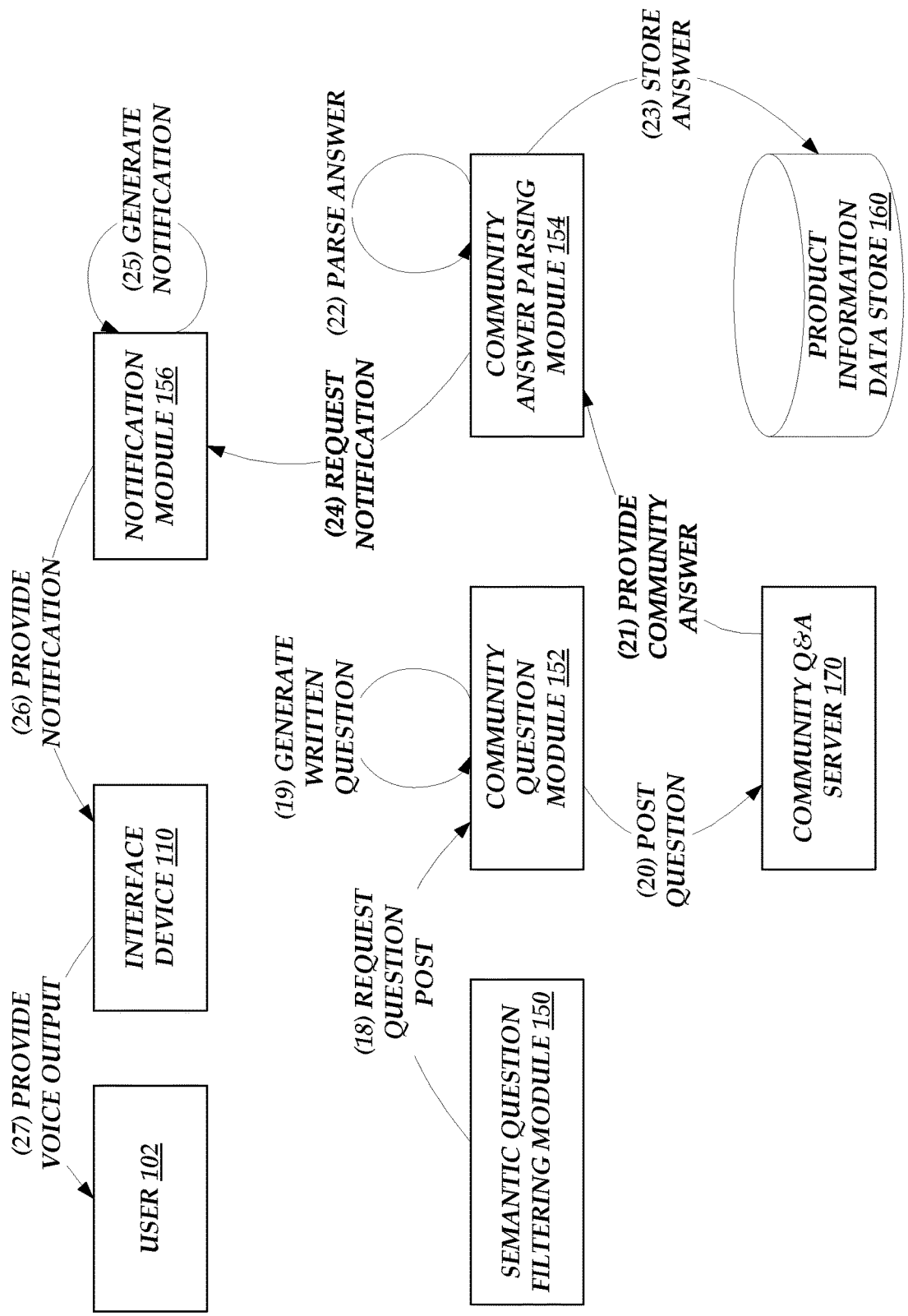

FIGS. 3A, 3B and 3C depict example interactions for validating the processing of speech input in accordance with aspects of the present disclosure. With reference now to FIG. 3A, at (1), a user 102 may provide audio input to an audio interface device 110. The audio input may illustratively contain speech, and the speech may include a query regarding a product attribute. At (2), the audio interface device 110 provides the audio input and associated metadata to the speech parsing module 142, which at (3) parses the audio to identify speech. The speech parsing module 142 may use techniques generally understood in the art to parse the audio and recognize speech, and these techniques may generally have varying degrees of accuracy. In some embodiments, the speech parsing module 142 may accurately parse the audio into speech, but the accurately parsed speech may be ambiguous, illogical, or malformed. For example, the user 102 may begin speaking a query and then be interrupted, and the audio interface device 110 may capture an incomplete query followed by part of a conversation between the user 102 and a third party. As a further example, the user 102 may ask "is that toy safe for children under three?" without providing sufficient information to identify a particular toy.

At (4), the speech parsing module 142 may provide the processed speech to a user question recognition module 144, which at (5) may determine that the speech represents a question regarding a product attribute. The user question recognition module 144 may therefore, at (6), request that the product identification module 146 identify a product based on the processed speech. The product identification module 146 may illustratively identify product-related keywords or description in the processed speech, and at (7) may query the product information data store 160 for a product or products that correspond to the keywords or description. For example, the processed speech may contain the words "Brand C," "sports," and "watch," which may correspond to a particular product in the product information data store (e.g., a "Brand C" analog sports watch). In some embodiments, the product information data store 160 may identify multiple products that correspond to the product-identifying information in the processed speech. In other embodiments, the product information data store 160 may return a "best match" for the product-identifying information. At (8), the product information data store 160 returns the identified product(s) and provides a unique identifier for each, and at (9) the product identification module provides the identified product(s) to the user question recognition module 144. In some embodiments, the product identification module 146 may further process a list of products to identify a particular product that corresponds to the speech input. For example, the product identification module 146 may identify a previously selected product, or may use information from previous speech inputs to determine a context for the request and identify a product that fits the context.

At (10), the user question recognition module 144 identifies a product attribute in the processed speech. Generally described, a product attribute may reference any distinguishing feature of a product, such as its size, color, the materials from which it is made (e.g., cotton, aluminum, etc.), a property that the product has (e.g., whether an edible product is organic or kosher, whether a product is recyclable or biodegradable, etc.), or other characteristics. In some embodiments, the user question recognition module 144 may identify a value associated with an attribute and thus identify the attribute indirectly (e.g., "is this pendant available in sterling silver" may be recognized as a particular value for the "materials" attribute, or "does the Brand X dining room table seat six people" may be recognized as a particular value for the "size" attribute). In some embodiments, the user question recognition module 144 may reference a list of "known" attributes and keywords associated with each of these attributes to identify a particular attribute in the processed speech input. In some embodiments, the user question recognition module 144 may identify multiple attributes in the processed speech (e.g., "is the red Brand X cotton T-shirt available in a large?"), and may identify a key attribute, a series of attributes, or a combination of attributes.

With reference now to FIG. 3B, at (11), the user question recognition module 144 may query the answer retrieval module 148 as to whether an answer is available for the question. Illustratively, the question identified at (5) may be answerable using existing information in the product information data store 160. For example, the product information data store 160 may include information as to the available sizes and colors for a particular product, or may include information regarding, e.g., operating temperatures, capacities, or other attributes that are typically specified in a product description. At (12), the answer retrieval module 148 may query the product information data store 160 for available product attribute information, and at (13) the product information data store 160 may return information regarding "known" product attributes. In some embodiments, the answer retrieval module 148 may query other information sources, such as a community Q&A server 170, to assess whether they contain an answer to the question.

At (14), in some embodiments, the answer retrieval module 148 may determine that the answer to the question identified at (5) is not available from the queried data sources, and thus it may be necessary to obtain an answer from an external source such as a community Q&A server 170. However, before doing so, the answer retrieval module 148 requests at (15) that the semantic question filtering module 150 determine an affinity score for the identified product and attribute. As described in more detail below, the semantic question filtering module 150 may at (16) determine an affinity score by, for example, taking a weighted average of determined affinities between the attribute and various product categories that include the identified product. The semantic question filtering module 150 may thus filter out questions that are likely the result of a parsing error or product identification error in one of the previous interactions. Illustratively, any of the interactions at (3), (5), (8), and (10) may produce an erroneous result: Speech may be parsed incorrectly into words that are different from what the user uttered, accurately parsed words may be processed to incorrectly identify a product other than the one the user intended or an attribute other than the one the user intended. For example, the user's audio input may be parsed into the words "is this coffee table made from wood" and interpreted as a query regarding the materials used in a piece of furniture, or may be parsed into the words "is this coffee maker made from wood" and interpreted as a semantically unlikely query regarding the materials used in a kitchen appliance. As a further example, the audio input may contain background noise that reduces the accuracy of the speech parsing module 142, or the user may be speaking softly or standing at a distance from the audio interface device 110. The interactions at and after (3) may thus be affected by the quality of the audio input. By determining an affinity score between the identified product and the identified attribute, the semantic question filtering module 150 may identify and filter out queries that are unlikely to be accurate representations of the user input.

At (17), the semantic question filtering module 150 may determine whether the affinity score determined at (16) satisfies a threshold. Illustratively, the affinity score may be compared to a threshold to assess the likelihood that a question is semantically valid. For example, the semantic question filtering module 150 may determine that the affinity between a "coffee table" product and a "material" attribute (having a value of "wood") is 0.8, which exceeds a threshold of 0.6 and indicates the question is semantically valid. As a further example, the semantic question filtering module 150 may determine that the affinity between a bestselling novel and the "waterproof" attribute is 0.1, which is below a threshold and indicates that either the product or the attribute was likely misinterpreted. In some embodiments, the semantic question filtering module 150 may dynamically determine the threshold based on factors such as affinities between a particular product and "known good" attributes. For example, the semantic question filtering module 150 may determine that a particular camera has affinity scores of 0.7 with a "pixel count" attribute, 0.6 with a "battery life" attribute, 0.3 with a "biodegradable" attribute, and 0.1 with a "flavor" attribute. The semantic question filtering module 150 may thus determine that, e.g., 0.5 is a reasonable threshold for detecting semantically meaningful questions regarding camera attributes. It will be understood that a question may be syntactically or semantically consistent (e.g., "is this camera edible?") but nonetheless filtered out by the semantic question filtering module 150 as unlikely to be an accurate representation of user intent or unlikely to lead to useful answers if posted to a community Q&A service.

With reference now to FIG. 3C, at (18), the semantic question filtering module 150 may request that the community question posting module 152 generate and post a written question based on the identified product and attribute. In some embodiments, the semantic question filtering module 150 may report the determined affinity score (or report that the affinity score satisfied a threshold) to another component, which may then determine whether to request that a question be posted. In other embodiments, the semantic question filtering module 150 may request the generation and posting of a question in response to its determination that the affinity score satisfies the relevant threshold. In some embodiments, the semantic question filtering module 150 may generate a spoken prompt (e.g., "I couldn't find an answer to your question. Would you like me to post the question online and notify you when an answer is available?") and cause the audio interface device 110 to output the spoken prompt the user 102. The user 102 may then confirm that they would like to post the question and receive a notification when an answer is posted.

At (19), the community question posting module 152 may generate a written question based on the processed audio, the identified product, and/or the identified attribute. Illustratively, the community question posting module 152 may use various techniques understood in the art for processing the speech input into a written question suitable for posting to a Q&A website. At (20), the community question posting module 152 may post the written question to the community Q&A server 170, which may publish the question and make it available for other users to answer.

Thereafter, at (21), the community Q&A server 170 may receive a written answer to the posted question from another member of the user community, and may pass he written answer to a community answer parsing module 154 for further processing. Illustratively, the question may be answered by another user who has purchased the product in question, a product support team, the manufacturer, or another user or entity. It will be understood that significant time (e.g., hours or days) may elapse between the posting of a question to the community Q&A server 170 and the posting of an answer or answers. In some embodiments, no answer may be provided and the interactions may proceed only as far as posting the question. In other embodiments, a number of written answers may be provided by members of the user community, and the community Q&A server 170 may provide multiple answers to the community answer parsing module 154.

At (22), the community answer parsing module 154 may parse the written answer to identify semantic content. For example, the answer to a question regarding a particular product attribute (e.g., "is this houseplant poisonous to dogs?") may be "yes" or "no," but the written answer may provide additional information or may answer the question indirectly. The community answer parsing module 154 may thus parse the written answer to identify content that directly answers the original question. In some embodiments, at (23), the community answer parsing module may store the obtained answer in the product information data store 160 in order to make the answer available to other users (e.g., users who have not yet asked the question) without querying or posting to the community Q&A server 170.

At (24), the community answer parsing module 154 may request that a notification module 156 generate a notification to the user 102 that an answer to the question has been posted. At (25), the notification module 156 may generate a notification. Illustratively, the notification module 156 may generate a spoken prompt (e.g., "An answer to your question about [product] is now available. Would you like to hear it?") as well as a spoken answer (e.g., "the Brand X smartphone is available in black, gray, red, or white"). The notification module 156 may then, at (26), provide the notification to the audio interface device 110, which may provide speech output including the answer to the user 102 at (27). In some embodiments, the audio interface device 110 may have a visual display and the notification may ask the user whether the audio interface device should display the written answer. In other embodiments, the audio interface device 110 may interface with other devices or applications (e.g., an application execution on a mobile computing device) to cause the answer to be displayed in a format or location convenient for the user 102. In some embodiments, the community answer parsing module 154 or the notification module 156 may determine whether to display or speak the answer depending on factors such as the answer's length or complexity.

It will be understood that FIGS. 3A, 3B, and 3C are provided for purposes of example, and that many variations on the interactions depicted herein are within the scope of the present disclosure. For example, the interactions at (15) and (16) may be carried out prior to the interactions at (11)-(14), and may thereby prevent the answer retrieval module 148 from trying to find answers to semantically unlikely questions. As a further example, the functions of user question recognition module 144 and the product identification module 146 may be combined, and the interactions at (6)-(9) may be consolidated to a query from the user question recognition module 144 to the product information data store 160. FIGS. 3A, 3B, and 3C are thus understood to be illustrative and not limiting.

Figure 4A:
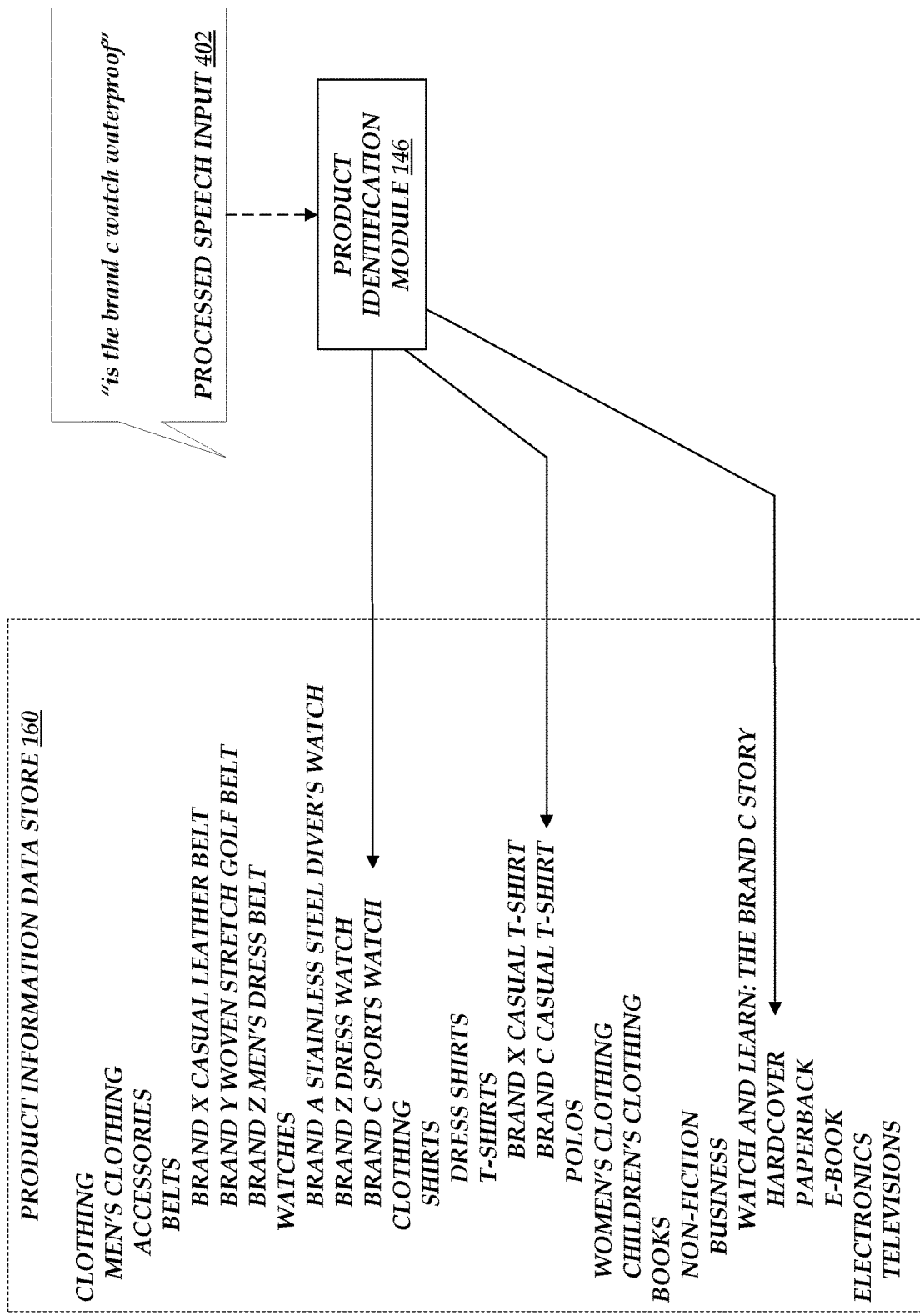

FIGS. 4A and 4B are pictorial diagrams illustrating identification of products in a product information data store 160 and determination of affinity scores between various product categories and an identified product attribute. With reference now to FIG. 4A, processed speech input 402 has been partially parsed into words and identified as a question regarding a product. The processed speech input 402 has thus been passed to a product identification module 146, which may identify a product from the product information data store 160. Illustratively, products in the product information data store 160 are organized into a hierarchical tree of product categories. For example, the product "Brand C Sports Watch" is a member of the categories "watches," "accessories," "men's clothing," and "clothing," each of which represents a broader and more general category that the category it precedes. The category "watches" is thus understood to be a sub-category of the "accessories" category, and may contain a number of products that fit the category (e.g., the "Brand A Stainless Steel Diver's Watch" and the "Brand Z Dress Watch").

The product identification module 146 may identify a specific product based on the processed speech input 402. For example, the product identification module 146 may determine based on the words "Brand C" and "watch" that the user speaking these words is referring to the "Brand C Sports Watch," and may thus return an identifier specific to that product. In some embodiments, however, the processed speech input may be ambiguous, incomplete, or erroneous. The product identification module 146 may thus identify other products, such as the "Brand C Casual T-Shirt" or the hardback book "Watch and Learn: The Brand C Story," as the subject of the user's query.

FIG. 4B depicts determination of affinity scores for particular nodes of the hierarchical tree of product categories and the "waterproof" attribute, which may be identified (e.g., by the user question recognition module depicted in FIG. 1) based on a keyword or key phrase in the processed speech input 402. For example, words or phrases such as "water resistant," "wet," "diver," etc., may be recognized as references to the "waterproof" attribute. Affinity scores may thus be determined between the "waterproof" attribute and the nodes of the hierarchical tree that correspond to categories. In some embodiments, affinity scores between various attributes and various nodes of the product catalog may be determined or predetermined based on historical questions to a community Q&A service. For example, the "clothing" category may contain over one million items, and a community Q&A service may contain several million historical questions regarding these items. The historical questions may indicate, for example, that less than ten percent of items in the "clothing" category have received questions regarding the "waterproof" attribute. In various embodiments, affinity scores may represent a confidence level that an item does or does not have the attribute, or a that questions about the attribute are semantically meaningful in the context of this product or product category. The relationship between an affinity score and a quantity of historical questions to a community Q&A service may thus not be direct or linear: A semantic question filtering module 150 may determine, for example, that users ask questions about the "waterproof" attribute of watches more frequently than they ask questions regarding the same attribute of products in other categories, and may thus assign a high affinity score to the attribute-category pairing even if questions about the attribute are relatively infrequent across all products.

An affinity score may thus be calculated for the "clothing" node of the product hierarchy that indicates the "waterproof" attribute has an affinity score of 0.1 with this node. A similarly low affinity may be determined for the "men's clothing" node, while the affinity between the subcategory "accessories" and the attribute may be slightly higher (e.g., 0.3). As the categories grow more specific, however, the affinity with a particular attribute may increase or decrease. For example, the affinity between the accessories sub-category "belts" and the "waterproof" attribute remains low, while the affinity between the sub-category "watches" and the attribute is significantly higher at 0.6. Affinity scores may further be calculated for individual products, which may correspond to leaf nodes in the hierarchical tree of product categories. For example, the affinity score between the "Brand A stainless steel diver's watch" may be calculated as 1.0. In some embodiments, an affinity score of 1.0 may indicate that the product information data store 160 contains a definitive answer to questions regarding this product and this attribute. It will be understood that the affinity score does not indicate whether the product does or does not have the attribute. Rather, the affinity score indicates whether questions about the attribute are semantically meaningful given the specified product or product category. For example, the definitive answer to the question "is the Brand Z Dress Watch waterproof?" may be "no." The affinity score of 1.0 thus indicates that the question is meaningful, not that the watch is waterproof.

In some embodiments, the semantic question filtering module may obtain predetermined affinity scores for nodes and attributes. For example, affinity scores relating nodes to attributes may be recalculated periodically as new questions are submitted to a community Q&A service. In may not be practical, however, to pre-calculate an affinity score for each attribute and each product in a catalog containing millions of items and a community Q&A service containing millions of questions. Accordingly, in some embodiments, the affinity score for a particular product and attribute may not be determined or known. For example, the affinity score for the "Brand C Sports Watch" has not been determined.

A semantic question filtering module (e.g., the semantic question filtering module 150 depicted in FIG. 1) may thus determine an affinity score for a particular product with regard to a particular attribute. Illustratively, the affinity score may be determined by taking a weighted average of affinity scores for category nodes that contain the particular product. For example, the categories that contain the product "Brand C Sports Watch" include "watches," "accessories," "men's clothing," and "clothing." These categories respectively have affinity scores of 0.9, 0.3, 0.1, and 0.1 with the "waterproof" attribute. The semantic question filtering module may illustratively assign the most specific category containing the product a weight of 0.67, the next-broadest category a weight of 0.2, a third-broadest category a weight of 0.1, and a broadest category a weight of 0.03. The semantic question filtering module may thus determine an attribute score of $(0.67*0.9)+(0.3*0.2)+(0.1*0.1)+(0.1*0.03)=0.68$ for the relationship between the "Brand C Sports Watch" and the "waterproof" attribute. The semantic question filtering module may further determine that this attribute score exceeds a threshold, and that questions regarding the "waterproof" attribute of the Brand C sports watch are therefore semantically valid. In various embodiments, weighting factors for affinity scores may be fixed, dynamically adjusted based on the relative size of categories, determined based on the affinity scores of products in the category, or determined based on other criteria. In some embodiments, a weighting factor of zero may be applied to categories that are sufficiently broad or otherwise determined to be uninformative. For example, the weighting factors for a first, second, and third category may be 0.67, 0.33, and 0.00.

Figure 5:
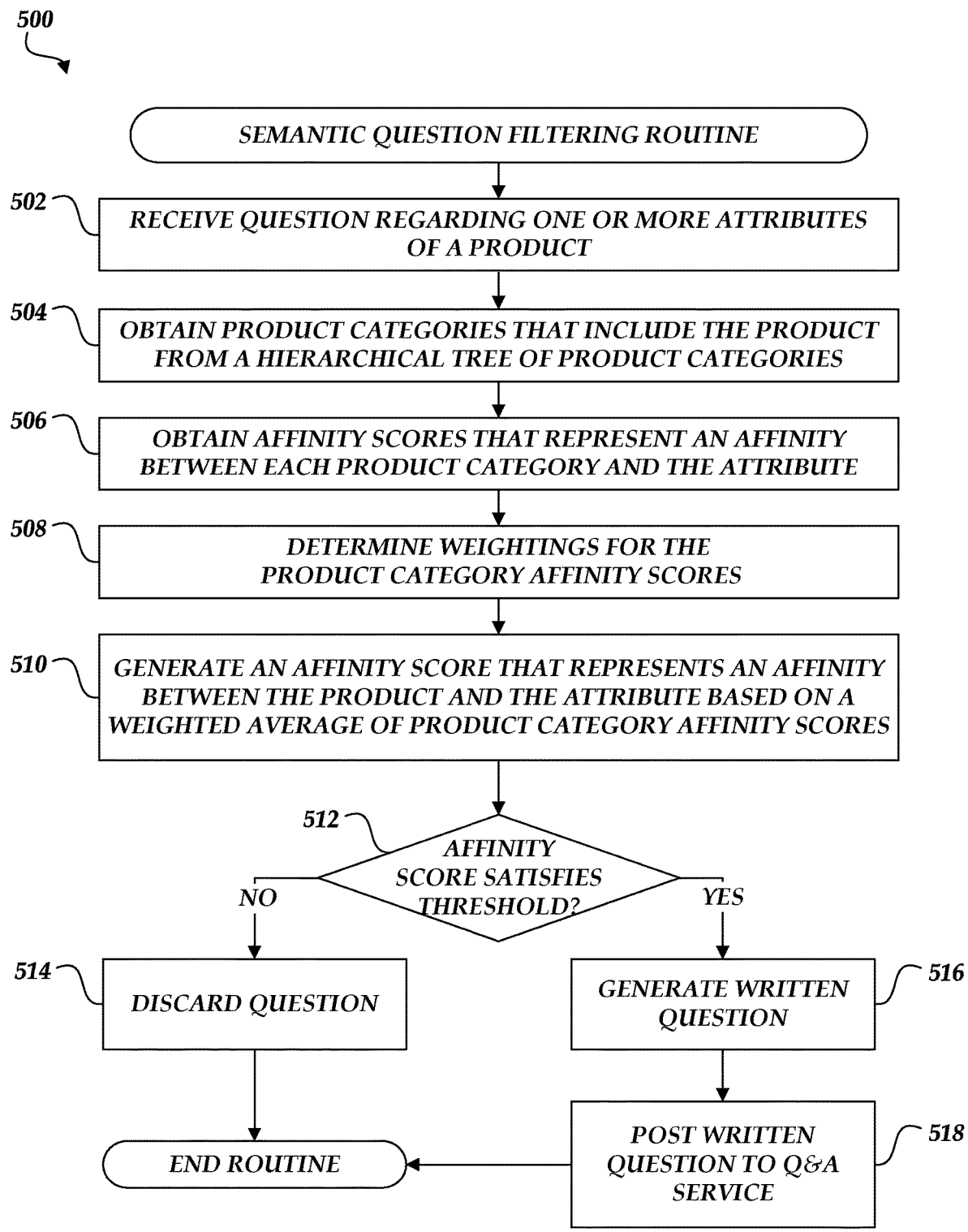
FIG. 5 is a flowchart depicting an illustrative routine for semantic question filtering in accordance with aspects of the present disclosure.

FIG. 5 is a flow chart depicting an illustrative routine 500 for determining attribute scores and processing speech input to determine semantic validity in accordance with aspects of the present disclosure. The routine 500 may be carried out, for example, by the semantic question filtering module depicted in FIG. 1. The routine 500 begins at block 502, where a question regarding one or more attributes of a product may be obtained. As described in more detail above, speech input from a user may be parsed to identify product keywords and attribute keywords, and specific products and attributes may be identified based on the keywords. In some embodiments, as described above, a key attribute, series of attributes, or combination of attributes may be obtained.

At block 504, product categories that include the specified product may be obtained from a hierarchical tree of product categories. Illustratively, the product categories may obtained from a data store, such as the product information data store 160 depicted in FIG. 1. The product category information obtained may, in some embodiments, include metadata such as the number of products in the category, the relationships between products in the category (e.g., whether products in the category typically have the same attributes), or other information regarding the category or the products it contains. It will be understood that the categories will each correspond to a node on a different level of the hierarchical tree, descending from the root of the tree to the leaf node that corresponds to the specific product.

At block 506, affinity scores may be obtained that represent an affinity between each of the product categories obtained at block 504 and the attribute obtained at block 502. As described in more detail above, affinity scores for the various categories may be determined based on, e.g., historical questions to a community Q&A service about attributes of various products.

At block 508, in some embodiments, weighting factors may be determined for the product categories. As described above, the weighting factors may be determined based on criteria such as the number and uniformity of products in the category, the sizes of the categories relative to each other, or other factors. At block 510, an affinity score may be calculated for the specified product based on the weighting factors and the affinity scores of the respective product categories.

At decision block 512, a determination may be made as to whether the affinity score determined at block 510 satisfies a threshold. If not, then at block 514 the question may be discarded and the routine 500 ends. In some embodiments, speech output may be generated and presented to a user (e.g., "I don't think I understood that question correctly. Can you repeat it?") to indicate that the speech input did not result in a semantically valid question. In other embodiments, the routine 500 may direct a speech parser, product identifier, or other module to retry or to select its next-most-likely interpretation of the input, and may iterate to assess whether some other interpretation of the input leads to a semantically valid question.

If the determination at decision block 512 is that the affinity score satisfies the threshold, then at block 516 a written question may be generated for posting to a community Q&A service, and at block 518 the question may be posted. In some embodiments, the routine 500 may then enter an idle state until an answer is posted (or until a sufficient number of answers are posted). In other embodiments, a separate routine may be invoked when an answer is received, and may parse the answer and store or deliver its content to the user.

It will be understood that FIG. 5 is provided for purposes of example, and that many variations on the routine 500 are within the scope of the present disclosure. For example, affinity scores that relate product categories to attributes may be obtained prior to execution of the routine 500, and the categories that contain the specified product may be selected from the full list of categories. As a further example, blocks 508 may be omitted in favor of predetermined weightings for the product categories. The depicted routine 500 is thus understood to be illustrative and not limiting.

Figure 6:
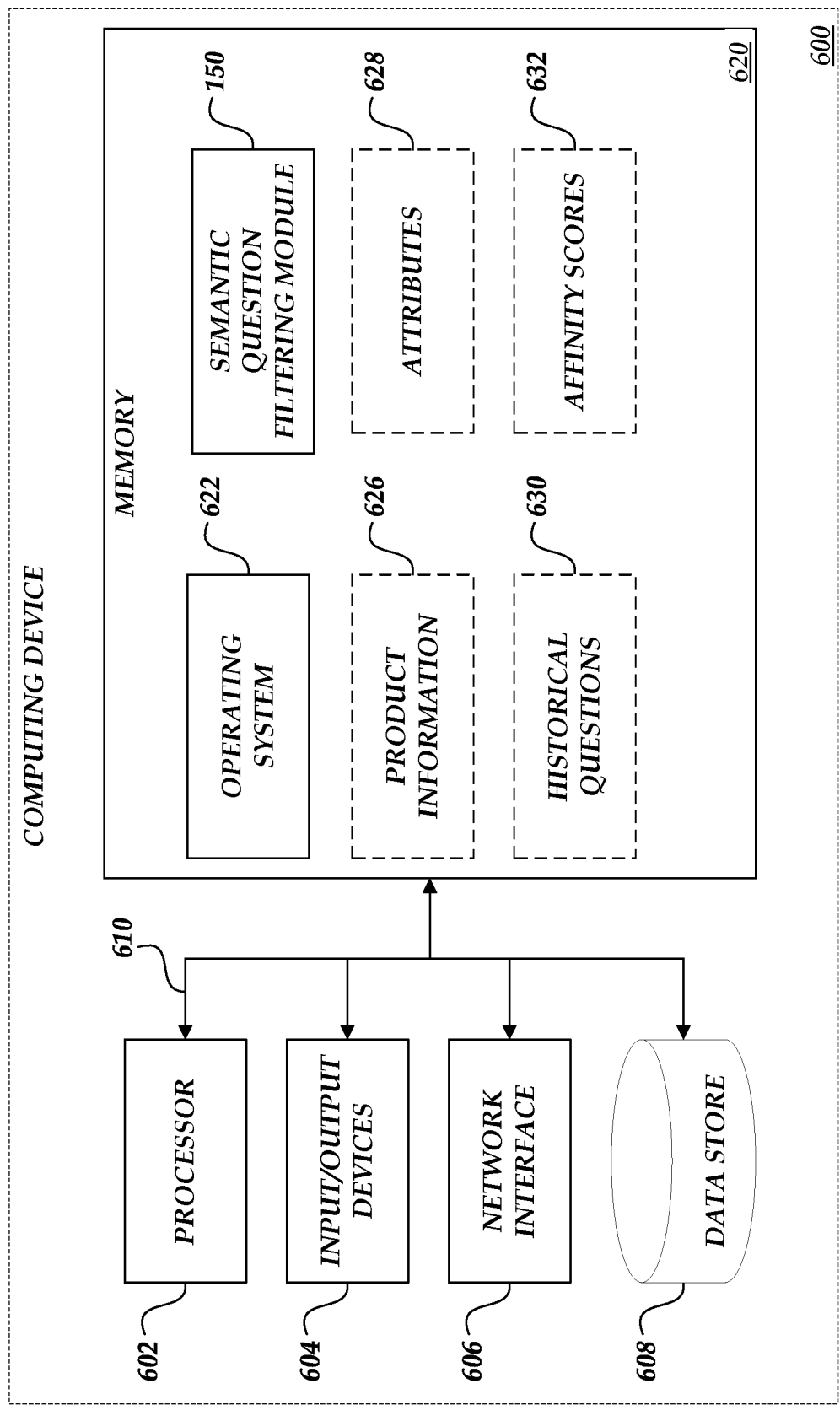
FIG. 6 depicts a general architecture of a computing device implementing a semantic question filtering module in accordance with aspects of the present disclosure.

FIG. 6 depicts a general architecture of a computing device 600 that includes an arrangement of computer hardware and software configured to implement aspects of the present disclosure. The computing device 600 may include many more (or fewer) elements than those shown in FIG. 6. It is not necessary, however, that all of these elements be shown in order to provide an enabling disclosure.

As illustrated, the computing device 600 includes a processor 602, input/output devices 604, a network interface 606, and a data store 608, all of which may communicate with one another by way of a communication bus 610. The network interface 606 may provide connectivity to one or more networks (such as the network 120 depicted in FIG. 1) or computing systems and, as a result, may enable the computing device 600 receive and send information and instructions from and to other computing systems or services, such as the product information data store 160 and the community Q&A server 170 depicted in FIG. 1. In some embodiments, the computing device 600 may be configured to process requests from other devices or modules, such as requests to initiate network communications. The data store 608 may illustratively be any non-transient computer-readable data store, and in some embodiments may include all or part of the product information data store 160 depicted in FIG. 1.

The processor 602 may also communicate to and from a memory 620. The memory 620 may contain computer program instructions (grouped as modules or components in some embodiments) that the processor 602 may execute in order to implement one or more embodiments. The memory 620 generally includes RAM, ROM, and/or other persistent, auxiliary, or non-transitory computer-readable media. The memory 620 may store an operating system 622 that provides computer program instructions for use by the processor 602 in the general administration and operation of the computing device 600. The memory 620 may further store specific computer-executable instructions and other information (which may be referred to herein as "modules" or "engines") for implementing aspects of the present disclosure. For example, the memory 620 may include a semantic question filtering module 150, which may implement aspects of the present disclosure such as determining whether processed speech input is semantically valid. The memory 620 may further include product information 626, product attributes 628, historical questions 630, and affinity scores 632, which may be loaded into the memory 620 as various operations are performed or may be generated by the performance of these operations.

While the operating system 622 and semantic question filtering module 150 are illustrated as distinct modules in the memory 620, in some embodiments, the semantic question filtering module 150 may be incorporated as a module in the operating system 222 or another application or module, and as such, separate modules may not be required to implement some embodiments.

It will be recognized that many of the components described in FIG. 6 are optional and that embodiments of the computing device 600 may or may not combine components. Furthermore, components need not be distinct or discrete. Components may also be reorganized. For example, the computing device 600 may be represented in a single physical device or, alternatively, may be split into multiple physical devices. In some embodiments, components illustrated as part of the computing device 600 may additionally or alternatively be included in other computing devices (such as the networked service 140 of FIG. 1), such that some aspects of the present disclosure may be performed by the computing device 600 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computer-implemented method comprising:
receiving processed voice input associated with a user question, the processed voice input including an identification of one or more product keywords and a product attribute;
identifying, based at least in part on the one or more product keywords, a first product in a product catalog;
obtaining, from the product catalog, product information associated with the first product, the product information including information regarding one or more attributes of the first product;
determining that a responsive answer to the user question cannot be formed from the product information;

obtaining, from the product catalog, a plurality of nodes from a hierarchical tree of product categories, wherein individual nodes of the plurality of nodes correspond to levels of the hierarchical tree, and wherein each node of the plurality of nodes corresponds to a plurality of products that includes the first product;

obtaining, for each node in the plurality of nodes, an affinity score representing an affinity between the node and the product attribute;

determining, based at least in part on a weighted average of the affinity scores for each node in the plurality of nodes, a first affinity score between the first product and the product attribute; and in response to a determination that the first affinity score satisfies a threshold:
  generating a query based at least in part on the first product and the product attribute; and
  causing transmission of the query.

2. The computer-implemented method of claim 1, wherein a first node of the plurality of nodes corresponds to a general product category, and wherein a second node of the plurality of nodes corresponds to a specific product category.

3. The computer-implemented method of claim 1 further comprising determining the threshold.

4. The computer-implemented method of claim 1, wherein weighting factors for individual nodes in the plurality of nodes are determined based at least in part on a number of products in the product category corresponding to the node.

5. A system comprising:
  a data store configured to store a hierarchical tree of product categories, product identifiers, and product information; and
  a processor in communication with the data store, wherein the processor is configured with specific computer-executable instructions to perform operations including:
    obtaining, based at least in part on processed voice input, a first product identifier and a product attribute, wherein the first product identifier is associated with a first product;
    obtaining, from the data store, a plurality of nodes from the hierarchical tree, wherein individual nodes of the plurality of nodes correspond to a level of the hierarchical tree and a product category that includes the first product;
    obtaining, for each node of the plurality of nodes, an affinity score representing an affinity between the node and the product attribute;
    determining that a weighted average of the affinity scores for each node of the plurality of nodes satisfies a threshold; and
    in response to determining that the weighted average satisfies the threshold, causing a question regarding the first product and the product attribute to be output.

6. The system of claim 5, wherein the operations further include:
  receiving, from a community question and answer service, one or more answers corresponding to the question; and
  generating speech output based at least in part on the one or more answers.

7. The system of claim 6, wherein the operations further include notifying a user associated with the processed voice input that the speech output is available.

8. The system of claim 7, wherein the operations further include causing an audio device to play the generated speech output in response to a voice command from the user.

9. The system of claim 6, wherein the operations further include updating the product information associated with the first product to include at least a portion of the one or more answers.

10. The system of claim 5, wherein the affinity score for each node of the plurality of nodes is determined based at least in part on historical questions submitted to a question and answer service for individual products in the product category corresponding to the node.

11. The system of claim 5, wherein the operations further include determining the threshold based at least in part on historical questions submitted to a question and answer service.

12. The system of claim 5, wherein the operations further include determining, based at least in part on the weighted average satisfying the threshold, that the first product identifier and the product attribute have been correctly obtained from the processed voice input.

13. The system of claim 5, wherein the processed voice input comprises one or more product keywords and one or more attribute keywords.

14. The system of claim 5, wherein the operations further include generating the question based at least in part on the first product and the product attribute.

15. A non-transitory computer-readable medium containing computer-executable instructions that, when executed by a processor, configure the processor to perform operations including:
  in response to a product information request that includes a first product and a product attribute, obtaining a plurality of nodes from a hierarchical tree of product categories, product identifiers, and product information, wherein individual nodes of the plurality of nodes correspond to a level of the hierarchical tree and a product category that includes the first product;
  obtaining, for each node of the plurality of nodes, an affinity score representing an affinity between the node and the product attribute; and
  in response to determining that a weighted average of the affinity scores for individual nodes of the plurality of nodes satisfies a threshold, causing a question regarding the first product and the product attribute to be output.

16. The non-transitory computer-readable medium of claim 15, wherein the operations further include determining that a responsive answer to the product information request cannot be generated from existing product information associated with the first product.

17. The non-transitory computer-readable medium of claim 15, wherein the operations further include determining the affinity score for each node of the plurality of nodes.

18. The non-transitory computer-readable medium of claim 15, wherein the operations further include generating the question based at least in part on processed audio input that corresponds to the first product and the product attribute.

19. The non-transitory computer-readable medium of claim 15, wherein the weighted average is determined based at least in part on historical questions posted to a question and answer service.

20. The non-transitory computer-readable medium of claim 15, wherein the question is posted to a question and answer service.

21. The non-transitory computer-readable medium of claim 15, wherein the product information request includes a processed voice input corresponding to the product information request.

\* \* \* \* \*